Figure 1:
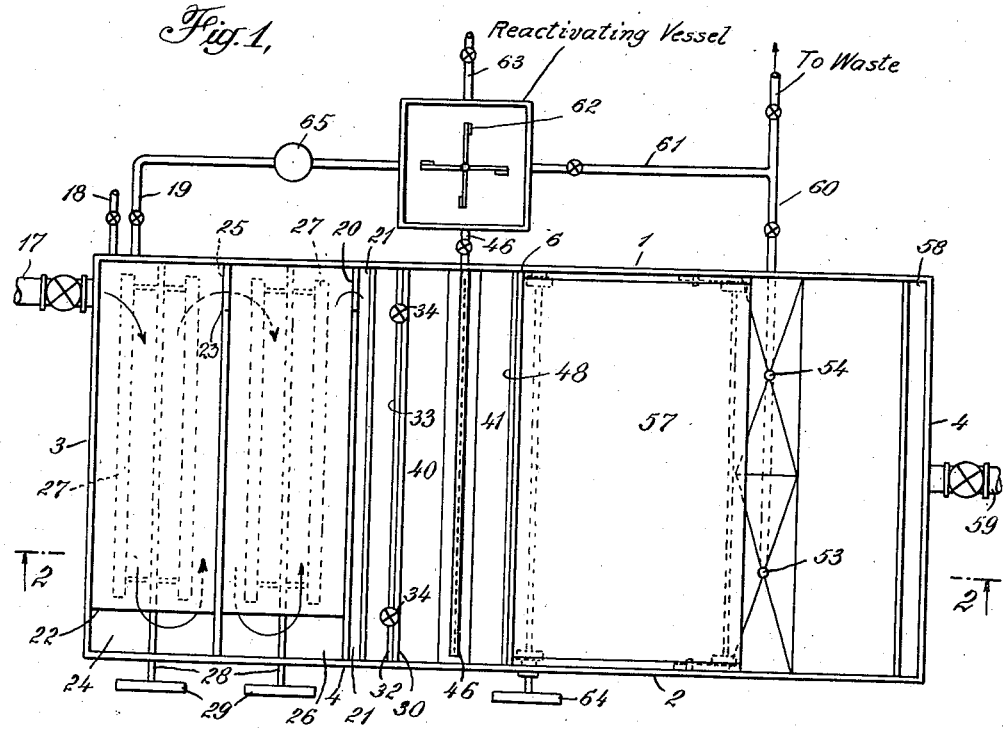

Aug. 30, 1938.   C. J. VELZ   2,128,569

TREATMENT OF WATER AND SEWAGE

Filed Jan. 18, 1935

Mixing Basin

Agglomerator Clarifier

Sedimentation Basin

INVENTOR
Clarence J. Velz
BY
Pennie, Davis, Marvin & Edmonds
ATTORNEYS

Patented Aug. 30, 1938

2,128,569

UNITED STATES PATENT OFFICE 2,128,569

TREATMENT OF WATER AND SEWAGE

Clarence J. Velz, Watchung, N. J.

Application January 18, 1935, Serial No. 2,336

16 Claims. (Cl. 210—16)

This invention relates to the treatment of water, sewage or similar liquors for the removal of objectionable suspended, colored or colloidal matter therefrom and has for its object the provision of certain improvements therein. More particularly, the invention contemplates an improved apparatus for and method of effecting a more efficient and complete flocculation of such objectionable matter and clarification of the liquor.

In accordance with my improved method of treating aqueous liquor (e. g., water to be conditioned for potable or industrial purposes, or domestic or industrial sewage) for the removal of objectionable matter (suspended, colored or colloidal matter), I am able to obtain a highly effective separation of the objectionable matter, in flocculent form, from the aqueous liquor. I have discovered a number of improved operations or steps and a new procedure in the treatment of aqueous liquors for the removal of objectionable matter therefrom, comprising a combination of manipulative steps and control of conditions therein, and my invention includes the application of these discoveries alone or in combination.

My invention contemplates certain improvements in the preparation and utilization of floc-producing agents, i. e. agents conducive to the formation of flocculent matter in aqueous liquors. In the conditioning of aqueous liquor for the removal of objectionable matter in flocculent form, I may introduce any suitable original floc-producing agent (a new, unusued agent freshly prepared, e. g., from a salt of a metal of high valency, such as aluminum, iron or chromium, or a mixture or combination of such salts) into the liquor, but according to a preferred method of my invention, I add reactivated flocculent matter together with an original floc-producing agent to the liquor and agitate the same to obtain a uniform dissemination of the agents in the liquor. I may use any appropriate agitation but prefer to carry out the method in a chamber providing a long passage for the flow of the liquor, and I may employ auxiliary mechanical or air agitators. It is one of the objects of my invention to reactivate flocculent matter removed from the treatment of aqueous liquor and to return the reactivated flocculent matter to the process in controlled quantity.

As a result of my investigation and experimentation I have discovered an improved control of the flow of liquor containing flocculent matter which results in an improved separation of the objectionable matter from the liquor. I have found that aqueous liquor properly mixed with a floc-producing agent can be charged into the lower portion of a chamber at a relatively high velocity and passed upwardly at a progressively reduced rate with the resultant formation of a suspended or floating blanket of flocculent matter. The suspended matter or blanket serves as a screen through which the liquor must pass, and this results in an agglomeration of the flocculent matter and its effective separation from the liquor. One of the broad aspects of my invention, accordingly, comprises the passing of an aqueous liquor containing a floc-producing agent at a relatively high rate of flow into a chamber and then upwardly in the chamber at a progressively reduced rate of flow.

My present invention further contemplates certain improvements in the sedimentation of liquor containing flocculent matter. I have found that when liquor containing flocculent matter, agglomerated more or less as a result of suitable treatment for that purpose, is passed upwardly and then horizontally, a very precipitous descent of the flocculent matter occurs during the horizontal movement of the liquor. It is, therefore, one of the objects of my invention to pass liquors containing agglomerated flocculent matter upwardly and then horizontally through a suitable chamber for the rapid precipitation of such matter.

A further object of my invention involves the reactivation of agents conducive to the formation of flocculent matter. In this improved step of my method I subject liquor containing a relatively high concentration of flocculent matter to reactivation treatment comprising adjusting the ion concentration of the liquor to a point above or below that which will convert the flocculent gel into a colloidal sol. I have discovered that a very highly effective floc-producing action results by introducing a mixture of suitably reactivated floc-producing agent, together with one or more original floc-producing agents into the liquor to be treated, and it is one of the objects of my invention to incorporate such a mixture in suitable proportions into the liquor to produce flocculation of the objectionable matter.

In carrying out the method of my invention in its complete and preferred form, the aqueous liquor to be treated is first passed into a mixing basin wherein I add one or more agents conducive to the formation and development or flocculent matter. The particular agent or agents selected depends upon the nature of the liquor being treated and may consist of one or more of the usual agents used for such purposes. I preferably introduce metallic compounds which not only produce flocculent matter effective as a clarifying agent, but also flocculent matter formed therefrom which can be reactivated and re-used in successive applications. This use and re-use of reactivated flocculent matter in certain respects is similar to the process of recirculation of sludge, but it is distinctly different in its clarifying characteristics. When substituting reactivated flocculent matter for a portion of the floc-producing agent, I found that substantial saving in the amount of floc-producing agent required (ranging from 20% to 50%) is effected. The method of reactivation will be described in detail hereinafter. I have found that salts having a metal constituent of high valency (or mixtures or combinations of such salts) such as aluminum, iron and chromium are particularly effective agents in this method.

The necessary quantity of coagulant and the quantity of reactivated flocculent matter used depends upon the nature of the liquor being treated, and in each specific case can readily be determined in a manner similar to the methods now in use for establishing the dosage of coagulant. In most cases I find that the use of reactivated flocculent matter in an amount equal to 1% to 5% by volume of the liquor being treated therewith sufficient to effect a saving in floc-producing agent of from 20% to 50%.

The liquor containing the floc-producing agent is then thoroughly agitated to obtain a uniform distribution of the agent throughout each successive unit of effluent from the mixing chamber. I have found a method of mixing which produces an equal quantity of floc nuclei in each successive unit of effluent which the next step of my method quickly and completely agglomerates, thereby effecting a high degree of clarification of the liquor. Efficient and effective mixing requires agitation, while efficient and effective agglomeration of flocculent matter requires quiescence. Therefore, by conducting agglomeration and clarification as a separate step, I can separate these two operations so that mixing is confined to an operation of mixing or agitation whereby certain matters are uniformly distributed throughout the liquor treated, all in preparation for the distinct and separate operation of agglomeration and clarification.

The type of chamber best suited to the mixing operation, I have found is one in which dispersion or short circuiting is minimized. In general, the most effective and efficient chamber is one which for a specific volume and specific rate of flow of liquor will provide the longest distance of travel from the inlet to the outlet. I have also found that the control of short circuiting is of more importance than the type of device used in the chamber for agitation and mixing. Any of the known devices for agitation, such as mechanical paddle wheels, or diffusion of air may be employed in the chamber to assist the agitation. I prefer to measure the effectiveness and efficiency of the mixing operation by the degree of dispersion. For example, I have found that in the treatment by my preferred practice, of a certain surface water, principally for the removal of colored matter, I obtained an 80% reduction in colored matter by using a mixing chamber having a long path of travel from inlet to outlet, both when using mechanical agitation devices and when using air for agitation. The capacity of this mixing chamber was equivalent to the volume of thirty minutes of uniform flow of water and the dispersion index was measured to be 1.5. (By dispersion index I mean the ratio of the time required to pass 90% of a given volume of matter through the chamber to the time required to pass 10% of the volume of matter through the chamber, a ratio of 1.0 representing a perfect theoretical passage time, with no dispersion.) On the other hand, under otherwise comparable conditions when I changed the mixing chamber so that the capacity of the chamber was doubled and so that the path of travel from inlet to outlet was reduced to one-fourth of the previous distance, both when using mechanical agitation devices and when using air, I obtained only a 30% reduction in colored matter. Even though the capacity of the mixing tank was doubled to provide for a volume equivalent to sixty minutes of uniform flow of water, the shortening in the distance of travel resulted in a dispersion index of 5.2. Therefore, in my preferred practice I may use any of a number of well known mixing devices which will fit into the mixing chamber, the important consideration being uniform mixing and a low dispersion index.

The effluent liquor from the mixing step of the method enters that part of the treatment which I have designated as the agglomeration and clarification step. I carry out the agglomeration and clarification step of the process in a chamber designed to aid in the desired control over the flow of liquor, preferably in a chamber embodying characteristics found in the unit of apparatus which I have herein described as an agglomerator-clarifier. The liquor enters the chamber at the bottom at a relatively high velocity and flows upwardly at a controlled rate, varying gradually from a high velocity at the bottom entrance to a low velocity at the top. I prefer to control the flow in such a manner that a floating blanket of flocculent matter is maintained in the vicinity of the central portion of the chamber, e. g. midway between the top and bottom. The space between the blanket and the bottom entrance is free of accumulations and the space above the blanket consists of clarified liquor or a mixture of clarified liquor and well formed flocculent matter.

I find that particles of matter in the liquor in the form of floc nuclei are bombarded against the floating blanket by the high bottom velocity of the liquor. The nuclei are thereby rapidly and completely agglomerated and compressed into relatively large, dense, tough particles which possess unusual characteristics highly beneficial in clarification and further treatment operations. The particles have a high subsidence velocity, are large, dense and tough and not fragile and delicate.

Two fundamental principles are involved in this step of my process, (1) the simultaneous rapid and complete mass agglomeration of flocculent material uniformly throughout the liquor treated, and (2) the upward flow of liquor through the mass accumulation of flocculent matter constituting the floating blanket.

The first principle is particularly effective in clarifying liquors of colored matter and colloidal matter, wherein the clarification is effected by agglomeration or precipitation—a reaction supposedly physico-chemical in nature, requiring intimate contact between the flocculent matter and the colored and colloidal matters to effect the reaction and produce universal concomitant precipitation.

The second principle is effective to a certain extent in clarifying liquors of colored or colloidal matter, or either of them, but is particularly effective in entrapping and removing suspended matter, supposedly by a mechanical process of arresting or filtering.

The accumulation of flocculent matter in the floating blanket can be removed from time to time as desired. This step of agglomeration and clarification has been found highly effective in carrying out my complete process, but it is in no way restricted to the particular preliminary or subsequent treatments which I employ.

The liquid is next subjected to the separation of flocculent matter from clarified liquor. In the treatment of certain liquors, particularly where large volumes are involved, I have found that it is more economical not to effect complete separation of flocculent matter in the clarification and agglomeration step, but to allow the effluent therefrom to consist of a mixture of clarified liquor and agglomerated flocculent matter, and perform the separation by other means such as by sedimentation or by filtration. I prefer to use the sedimentation method. As stated hereinbefore, the particles of flocculent matter produced in the clarification and agglomeration step possess an unusually high subsidence velocity, and are completely formed into large, dense, tough particles. By virtue of these facts, the separation by sedimentation is effected in an extremely short time ranging from one-fifth to one-twentieth of the time usually required in other sedimentation methods usually used in water and sewage treatment. Although not essential, I prefer a shallow sedimentation basin or tray in this operation. I have found that the flocculent matter upon being released from the vertical force of the upward flow of liquor in the clarification and agglomeration step, when the direction of the flow is changed to horizontal flow, immediately tends to take a precipitous descent downward to the bottom. In certain instances this descent is so rapid as to cause disturbance of the settled material at the bottom, and therefore, I prefer to use what I call a stationary parabolic floc accumulator. I have found that by the use of such an accumulator the flocculent matter contained in the effluent from the agglomeration and clarification step is directed along the parabolic accumulation and is rapidly and completely decelerated, and retained within it, without breaking or carrying over. This method of sedimentation permits velocities two to three times the usual rates of flow, and the separation is accomplished in an extremely short period.

Continuous sludge scraping and removing devices of the standard chain or belt type can be used to remove continuously the accumulations and to maintain the parabolic form of the stationary accumulation. For example, I have found that in the treatment of a particular water supply by my preferred method, and using this type of separator, I was able to obtain practically complete separation of flocculent matter in a sedimentation basin of capacity equivalent to ten to fifteen minutes of flow. I do not attribute this result entirely to this separation step, since without the aid of the previous agglomeration and clarification step, such a high degree of improvement in treatment would not be possible either in separation or filtration.

The next major operation or step of my preferred practice is the reclamation of flocculent matter by the process of reactivation. As stated hereinbefore, in the process of reactivation, previously formed and used flocculent matter has clarifying characteristics possessed by newly formed flocculent matter. These clarifying characteristics are imparted to the flocculent matter without resorting to decomposition or regeneration of the flocculent matter into a form of the coagulant chemical added to produce the flocculent matter initially. The reactivation of flocculent matter leaves its physical structure essentially unchanged. When reactivated flocculent matter is added to the liquor being treated, the reaction is physico-chemical in nature rather than purely chemical and therefore does not materially alter the chemical constituents of the liquor being treated. In treating certain liquors this characteristic can be used to advantage particularly where a specific water or sewage is deficient in the chemical constituents required in the usual coagulation reactions, or where it is desired to minimize the change in constituents such as a change in concentration of hydrogen ions, thereby saving in the use of corrective agents.

Reactivated flocculent matter is particularly effective in clarifying liquors of colored or colloidal matter or mixtures thereof. The theory of this clarification is based on a physico-chemical concept, whereby the electrical charge acquired by the reactivated flocculent matter in the process of reactivation reacts with the electrical charge on the colored or colloidal matter thereby producing concomitant precipitation and effecting clarification. Flocculent matter initially formed from the addition of the coagulating agents presumably acquires its electrical charge from the constituents of the liquor being treated such, for example, as a positive charge by the absorption of hydrogen ions. It is a well known fact that clarification by the formation of flocculent matter is enhanced in certain waters by increasing the concentration of hydrogen ions in the water being treated. This is usually accomplished by the addition of large quantities of coagulating agent which in its reaction increases the concentration of hydrogen ions, or by the addition of acids which produce a high concentration of hydrogen ions. In either case the treatment is given to the entire volume of water being treated and generally requires relatively large quantities of either coagulant or acid or both.

In a certain sense my preferred method is similarly accomplished, but it is distinctly different in that by my method I impart the electrical charge to flocculent matter which already has been formed and previously been used in clarification, which is to be formed and used for the first time, in a separate operation before the flocculent matter is added to the liquor being treated. I have found that by this separate operation the electrical charge is imparted or reimparted much more efficiently and economically, that by virtue of this separate operation the bulk of the water need not be adjusted, and also that the change in chemical constituents of the water resulting from the reaction of the coagulants is minimized. I have also found that charged or recharged flocculent matter added to the liquor being treated, together with coagulating agents, accelerates the formation of new flocculent matter from such agents. In a certain sense this reactivated flocculent matter acts as a catalytic agent and at the same time provides the nuclei about which the new flocculent matter readily forms.

I have found that flocculent matter formed from coagulating agents of salts the metal constituent of which is of high valency such as aluminum, iron and chromium, is capable of acquiring an electrical charge readily if thoroughly and uniformly mixed with a high concentration of hydogen ions. I have also found that this flocculent matter is capable of reactivation and re-use in repeated operations, and that when reactivated flocculent matter is used in conjunction with a reduced dosage of coagulating agent the flocculent matter is maintained satisfactorily as to quantity, quality and effectiveness. Furthermore, with the use of reactivated flocculent matter in an amount equivalent to 1% to 5% by volume of the liquor being treated, excellent results can be obtained, and a reduction in the amount of coagulating agent from 20 to 50% is permitted.

Thus, in accordance with my invention, I withdraw for reactivation flocculent matter with either the agglomeration and clarification step or from the sedimentation step, or both, in an amount equivalent to 1% to 5% of the volume of the liquor being treated—the exact amount depending upon the nature of the liquor being treated and the concentration of the flocculent matter withdrawn. If the concentration is high, 1% to 2% is usually all that need be used; if the concentration is low, 4% to 5% is required. This matter is passed into an appropriate reactivator which should be of sufficient capacity to accommodate a volume equivalent to five to ten minutes of flow of flocculent matter. A preferred form of reactivator is one that is small in area and deep. The reactivator should be equipped with an agitating device, preferably of the paddle wheel type with a vertical shaft. Agitation should be sufficiently vigorous to insure uniform mixing of the flocculent matter and reactivating agents, and also to insure a uniform concentration of the flocculent matter throughout all parts. The agitation should not be violent. I prefer a continuous flow reactivating vessel with flocculent matter and reactivating agent inlets at the top and a discharge outlet at the bottom.

The choice of reactivating agent or agents depends upon the nature of the coagulant used to form the flocculent matter and the nature of the colored or colloidal matter to be removed from the liquor. In general, the reactivating agents I prefer have a high concentration of hydrogen or hydroxyl ions, although other highly active positive and negative ions may be used. For example, in the treatment of certain waters for the removal of colored or colloidal matter or both, the flocculent matter which I prefer is that formed from a coagulating agent consisting of a proportion of aluminum salt (50 to 90%) and a proportion of iron salt (50% to 10%) such as a proportion of 70% commercial aluminum sulphate with 30% commercial ferric chloride or chlorinated copperas. The reactivating agent I prefer to use for such flocculent matter has a high concentration of hydrogen ions. The concentration of ions should be as high as possible but not to the extent that the flocculent gel is reversed into colloidal sol. Usually the concentration indicated by pH 3.0 to pH 4.0 is satisfactory. The quantity of agent necessary to produce and maintain the desired pH must be determined in each instance. I have found that usually a quantity of commercial sulphuric acid equivalent to 0.3 of a grain to 1.0 grain for each gallon of the bulk of the liquor being treated is sufficient to maintain the desired pH in the reactivating vessel. It is understood that other acids may be used than commercial sulphuric acid.

As another example, I have also found that in treating certain colloidal matters, particularly those common in sewage and those possessing a positive electrical charge, the preferable flocculent matter is that formed by iron salts and the agent used for reactivating this flocculent matter should contain a high concentration of hydroxyl ions added in an amount yielding a pH from 8.0 to 10.0. Any salt or alkali such as soda, commercial lime, caustic soda or others may be used as the agent to produce the desired pH.

I have also found that the reactivating process can be used as a means of applying and distributing other agents which may assist in the formation of flocculent matter and in clarification, but essentially have a separate function to effect. For example, I have found that economy and efficiency in the use of absorptive agents for removal of odor such as the use of activated carbon is effective if such agents are added to the reactivating vessel and thoroughly distributed with the flocculent matter. This method of application of activated carbon is particularly effective if used in conjunction with the agglomeration and clarification step of my process.

It is understood that the method and operation of charging or re-charging of flocculent matter as hereinabove described can be used in treatment methods other than that outlined as my preferred practice. For example, it can be used to charge newly formed unused flocculent matter formed in a separate operation, to re-charge flocculent matter previously formed and used in other operations, to form and at the same time charge new flocculent matter in itself, or it can be used in combinations of the above uses. In my preferred practice, I usually confine the operation to re-charging flocculent matter which has already been formed and used.

A further object of my invention is the provision of an improved apparatus comprising a number of units or devices in which I may carry out one or more of the method steps of my invention. When the various units comprising the apparatus of my invention are operatively associated, they comprise a structure suitable for the practice of the complete and preferred method of my invention.

In accordance with the apparatus of my invention I provide a mixing basin containing a plurality of interconnected chambers and means for the flow of liquor from chamber to chamber. I arrange the chambers to provide a long passage for liquor with accompanying suitable agitation. The basin is preferably constructed and arranged to provide operatively connected pairs of superposed chambers through which the liquor containing a floc-producing agent may flow while undergoing suitable agitation. I preferably provide inlet conduits at the end portion of one of the upper chambers for the admission of liquor and floc-producing agent, mechanical agitators in each chamber and a discharge weir at the end portion of one of the upper chambers.

The mixed liquor discharged from the mixing basin is preferably passed into the inlet opening of a unit which I have herein referred to as an agglomerator-clarifier. A unit found highly efficient in carrying out the agglomeration and clarification treatment of my invention is deep, long and narrow, with the inlet at the bottom along one entire long side or at intervals along the side to provide uniform distribution of flow upon entrance; and has an outlet at the top along the entire length of the opposite long side or at intervals along the opposite side. Local conditions affect the relationship of depth, length and width. In small units the ratio of depth to width may be as high as eight to one and even higher. In general practice, I prefer a ratio of depth to width of 2 to 1. The length of the agglomerator-clarifier depends upon local conditions and the volume of liquor to be treated; in general, the ratio of depth to length should be from 1 to 2, to 1 to 4.

In the majority of cases, therefore, I prefer agglomerator-clarifier proportions such as to provide a deep compartment of a capacity equivalent to a uniform flow of liquor being treated of ten to twenty minutes. These are general proportions and it is understood that a unit of other proportions and forms can be used to fit specific requirements, or such as circular, modified circular, or rectangular forms. However, I prefer to use the rectangular form. The side walls of the agglomerator-clarifier may be vertical, or sloping somewhat from the vertical. I prefer the vertical walls.

Internally the agglomerator-clarifier is preferably equipped with baffles arranged from the bottom to the top, either in a fixed, predetermined position, or made adjustable. These baffles are generally spaced to provide a series of passageways narrow at the bottom and gradually widening toward the top. The baffles may be horizontal, sloping or curved, and arranged to provide a tortuous path for the upward flow of liquor. I prefer V-shaped baffles. These baffles may be equipped with a collecting and removing device for collection and removal of accumulations of flocculent matter. One form of such apparatus may consist of a pipe manifold attached to the baffle collectors. At intervals of about three feet, inlets with wide mouthed, flared entrances are connected to the manifold. The manifold may discharge by hydrostatic pressure or by pumping into a reactivating vessel or to waste. I prefer this system of removal of flocculent matter since there are no moving parts; however, other removal devices can be used.

The type of outlet used in conjunction with the agglomerator-clarifier depends upon the subsequent treatment operations. In my preferred practice, where the treatment immediately following consists of a separator of the sedimentation type, the outlet of the agglomerator-clarifier which I prefer is across the top and is in the form of a shallow submerged weir. The weir crest is generally so arranged as to allow it to be raised or lowered. The depth of the crest below the liquor surface is generally small in comparison to the width of the agglomerator-clarifier and the depth of the sedimentation basin. For example, when the depth of the sedimentation tray or basin is equal to the width of the agglomerator-clarifier, the ratio of depth of the crest of the weir to the width of the agglomerator-clarifier should range from 1:4 to 1:8.

In a preferred combination of my apparatus I connect the outlet weir of my agglomerator-clarifier to the sedimentation basin of my invention. This basin is preferably rectangular in form and relatively shallow, and as constructed for carrying out my preferred practice, has an inlet weir along one upper edge that is in common with the outlet weir of the agglomerator-clarifier, and an outlet weir along the upper opposite edge. I provide a belt in operative association with the basin which serves as a sedimentation collecting or separating medium. The belt is preferably submerged in the liquor and is adapted to be actuated in such manner that the upper surface thereof moves in the direction of liquor flow. The belt is preferably suspended on two pulleys one of which is adjacent the inlet weir and the other adjacent a sludge sump in the basin bottom. The pulleys may be adjusted vertically and horizontally, and are preferably positioned to support the belt on an incline the high point of which is adjacent the inlet weir and the low point adjacent the sludge sump. By an appropriate adjustment of belt tension the upper surface forms a parabolic surface upon which the flocculent matter in the form of sediment settles. As the belt moves forward, the sediment is deposited in the sump from which it is removed by appropriate conduit means.

The conduit from the sludge sump may discharge its contents to waste or into a reactivating vessel. In the complete combination of my apparatus I discharge a predetermined quantity of flocculent matter, either from the agglomerator-clarifier or the sludge sump into a suitable reactivating vessel wherein I reactivate the floc-producing agent for return to the process.

Figure 2:
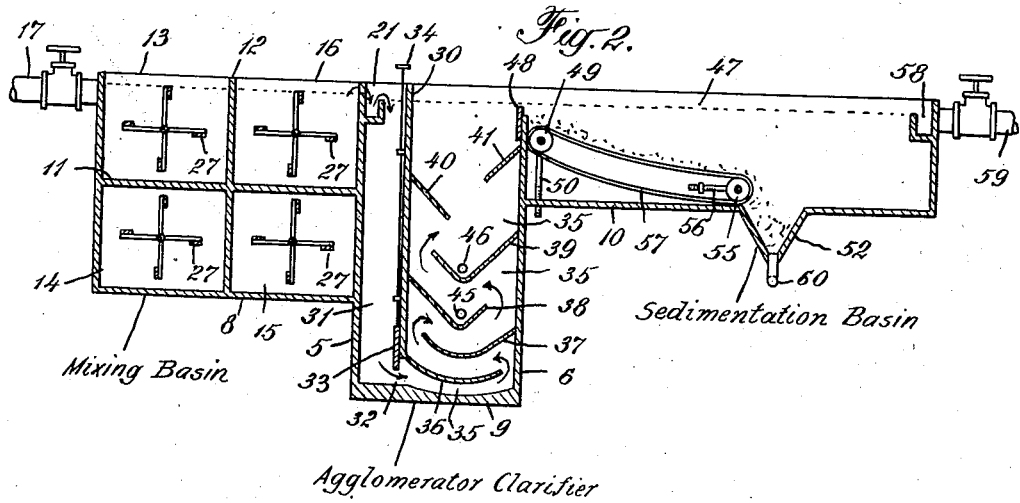

The accompanying drawing illustrates, somewhat diagrammatically, apparatus embodying the principles of my invention. In this drawing, Fig. 1 is a plan view of an arrangement of apparatus embodying my invention, and Fig. 2 is a sectional elevation on line 2—2 of Fig. 1.

In the drawing I have illustrated in combination a number of separate units of apparatus for the treatment of aqueous liquor comprising a mixing basin, a unit which I have designated as an agglomerator-clarifier, a sedimentation basin and a reactivating vessel in a preferred arrangement. The mixing basin, agglomerator-clarifier and sedimentation basin are preferably rectangular in form and of the same length, and may thus be conveniently combined together as shown by employing common end walls 1 and 2, walls 3 and 4, and dividing walls 5 and 6. As thus constructed, the mixing basin is formed between the walls 3 and 5, the agglomerator-clarifier between the walls 5 and 6, and the sedimentation basin between walls 6 and 4. The three units of apparatus are constructed each to hold liquid at about the same elevation but have different depths, the mixing basin extending to the bottom 7, the agglomerator-clarifier to the bottom 9, and the sedimentation basin to the bottom 10.

The mixing basin is preferably divided in the vertical and horizontal planes by dividing members 11 and 12 respectively forming the compartments 13, 14, 15 and 16. The upper compartment 13 (the inlet compartment) is provided with a valve controlled inlet conduit 17 for the admission of liquor to be treated and separate valve controlled inlet conduits 18 and 19 for the admission of an original and reactivated floc-producing agent respectively. These conduits are preferably located near the upper end of the chamber.

At the end and upper edge of wall 5 I have provided an outlet opening 20 which communicates with a weir box 21 extending the length of wall 5 into which liquor from the compartment 16 (outlet compartment) is discharged. The dividing wall 11 terminates at 22 and the under portion of dividing wall 12 (part below wall 11) terminates at 23, thereby forming openings 24, 25 and 26 for the flow of liquor progressively from compartment 13 to compartment 16. I may agitate the liquor in one or more of the compartments either by air or mechanically, and since I prefer mechanical agitation, I have illustrated rotary agitators 27 mounted upon shafts 28 and driven by the pulleys 29.

The agglomerator-clarifier has a hanging wall 30 extending from end wall 1 to end wall 2 spaced from the wall 5 so as to form an appropriate passageway 31 therebetween. The walls 6 and 30 are the side-walls of the agglomerator-clarifier. The side wall 30 terminates above the bottom 9 and thus forms an inlet opening 32 the length of the agglomerator-clarifier at the bottom thereof for the admission of liquor. The opening 32 should be controllable to meet varying conditions in operation, and I provide a gate 33 which is raised or lowered across the opening to control the flow of liquor by appropriate mechanism 34. By this construction and arrangement liquor may flow from compartment 16 into the weir box 21, thence into the conduit 31 and through the opening 32 into the agglomerator-clarifier.

I provide a chamber in the agglomerator-clarifier of relatively small cross-sectional area at the bottom and increasing cross-sectional area in the direction of the top. In my preferred construction I form a chamber 35 therein between the curved baffle 36 and bottom 9, the curved baffles 36 and 37, the V-shaped baffles 38 and 39, and the downwardly inclined baffles 40 and 41. These baffles are staggered, being alternately attached to the side walls 30 and 6 along their edges, and to the end walls 1 and 2 along their ends. These baffles may be adjustably mounted and I may employ any desired number. I have found it undesirable to allow flocculent matter to accumulate in the chamber between the bottom 9 and baffle 36, between baffles 36 and 37, or between baffles 37 and 38, and I have constructed the passageway between these members in the form of Venturi throats at the lower points to increase the velocity of flow and sweep upward any flocculent matter which might otherwise tend to accumulate.

The suspended or floating blanket of flocculent matter herein referred to develops in the vicinity of baffles 38 and 39, and to remove accumulations of such matter at these points, I extend the manifold collectors 45 and 46 through wall 1 into this vicinity of the agglomerator-clarifier and preferably along the trough-like parts of baffles 38 and 39, and I may use either pump action or gravity flow for the withdrawal of the liquor-containing flocculent matter through these manifolds.

The wall 6 dividing the agglomerator-clarifier and sedimentation basin does not extend to the normal liquor level 47, and the liquor can overflow from the agglomerator-clarifier into the sedimentation basin at this point. I have found it desirable to control the flow of liquor into the sedimentation basin and place an adjustable weir 48 along the upper edge of wall 6 for this purpose.

Along the upper edge of wall 6 a belt pulley 49 is mounted on the adjustable mechanism 50. A V-shaped sludge sump 52 sloping to two drainage points 53 and 54 is constructed in the bottom 10 of the sedimentation basin. Adjacent one edge of the sump a second belt pulley 55 is mounted on the adjusting mechanism 56. A belt 57 is mounted on the pulleys and by the desired adjustment of the mechanisms 50 and 56 the upper surface of the belt may assume the desired profile or inclination, preferably in the form of a parabolic curve. The belt may be rotated (upper surface in the direction of the sump) by a suitable mechanism 64. Along the upper edge of the wall 4 a weir box 58 is constructed for the overflow of liquor from the sedimentation basin. The liquor entering the weir box flows through a valve-controlled conduit 59 and is discharged for ultimate utilization or subsequent treatment.

The drainage points 53 and 54 of the sump 52 connect with a pipe 60 which carries the sediment to waste or into another pipe 61 which discharges into the upper portion of a reactivating vessel. The manifold collectors 45 and 46 from the agglomerator-clarifier may also connect with the reactivating vessel near the top and consequently flocculent matter may be charged into the vessel from either the agglomerator-clarifier or the sedimentation basin. The reactivating vessel is equipped with a rotary paddle wheel agitator 62 which is rotated to impart a mild agitation to the liquor. A pipe 63 for the admission of reactivating agents enters the upper portion of the vessel and a pipe 19 connects with the lower portion of the vessel for discharging reactivated floc-producing agent into the mixing basin. In certain instances it is desirable to employ a pump 65 to charge the reactivated agent into the mixing basin.

In carrying on the preferred and complete method of my invention in the combination of apparatus illustrated, an aqueous liquor to be treated is passed through conduit 17 at a controlled rate. By a suitable adjustment of gate valve 33, the adjustable weir 48 and valve-controlled conduit 58, a suitable flow of liquor is obtained. Newly formed unused floc-producing agents may be admitted through pipe 18 and reactivated floc-producing agent through pipe 19. The liquor flows through compartment 13, opening 24, compartment 14, opening 25, compartment 15, opening 26, compartment 16, opening 20 and into the weir box 21. During the flow through the mixing basin, the liquor is agitated by the rotary agitators 27, and a uniform distribution of floc-producing agent in the liquor results by the time the liquor enters the weir box 21. The liquor flows downwardly in the passageway 31 through the opening 32 and into the chamber 35. Due to the construction of the chamber 35, the liquor which enters the opening 32 at a relatively high velocity progressively decreases in velocity as it rises to the top. As a result of the controlled flow of liquor a suspended blanket of flocculent matter forms in the central portion of the chamber, i. e. in the region adjacent the manifold collectors 45 and 46, and serves as a screening medium for the liquor as it flows upward. When this blanket becomes too voluminous, a portion of the flocculent matter can be withdrawn by the manifold collectors 45 and 46. The floating blanket may be maintained at the desired location and consistency by controlling the velocity through the different passageways, or by removal of flocculent matter. In certain instances it may be advantageous to use an agitating device such as a jet of water from a pressure line provided at intervals with small orifices.

The flocculent matter withdrawn from the vicinity of the floating blanket by the manifolds 45 and 46 is preferably discharged into the reactivating vessel. The liquor leaving the chamber 35 and flowing over the weir 48 is in a more or less clarified condition depending upon the liquor being treated, etc., and the flocculent matter is largely in an agglomerated state. Due to the fact that the liquor is discharged along the upper surface over the weir 58, the liquor moves across the sedimentation basin without objectionable agitation. A very rapid settling of sediment or agglomerated flocculent matter takes place in this basin. In accordance with the principles described hereinbefore, the smooth parabolic surface of flocculent matter maintained on the belt is effective in separating flocculent matter from the clarified liquor. The profile of the belt may be adjusted by lowering or raising the pulley 49, or by moving pulley 55 forward or backward. The belt is operated at a speed to permit an even accumulation of flocculent matter.

The separation of flocculent matter from the liquor is practically complete in the sedimentation basin, the flocculent matter being collected on the parabolic surface of the belt 57 and discharged into the sump 52. The clarified liquor overflows into the weir 58 from which it is discharged by the conduit 59 to use or further treatment.

By gravity flow or by pump action, if desired, the sedimentation is conveyed through pipe 60 to waste or into the reactivating vessel by pipe 61. The liquor in the reactivating vessel containing a high concentration of flocculent matter (sediment or agglomerated flocculent matter) is subjected to suitable reactivation.

I withdraw from either the agglomerator-clarifier or the sedimentation basin, or both, liquor containing flocculent matter in an amount equal to from 1 to 5% of the volume of liquor being treated for reactivation. The liquor is charged into the upper end of the reactivating vessel through the manifolds 45 and 46 or the pipe 61, and the ion concentration is adjusted in accordance with the result sought to be accomplished. In the reactivation of flocculent matter containing a considerable percentage of an aluminum salt, for example, I add an acid, preferably commercial sulphuric acid through the pipe 63 at a desired rate to adjust the ion concentration to from pH 7 to 3 and preferably to within the range of from about pH 4 to 3.

In reactivating flocculent matter containing iron salts, I add an alkaline agent such as soda, lime, caustic soda or the like to adjust the ion concentration to from pH 7 to 10 and preferably to within the range of from about pH 8 to 10. The liquor and reactivating agent which have been charged into the top of the reactivating vessel flow downwardly therein, and a gentle agitation is imparted thereto by the paddle wheel 62 as the reactions of reactivation proceed. The flocculent matter is completely reactivated by the time it reaches the bottom of the vessel from which point it is discharged into the pipe 19 and passed into the mixing basin at the desired rate. Although I have described the use of chemical reagents for adjusting the hydrogen ion concentration, I may advantageously add other ions to accomplish the reactivation purposes of my invention as, for example, by adding a chemical compound capable of ionization and producing other ions, or by appropriate electric means.

It is understood that the descriptions herein represent my preferred practice and that the agglomerator-clarifier or method of agglomeration and clarification can be used as an independent device or method alone, or in conjunction with other treatment apparatus or processes such, for example, as to improve the separation of activated sludge from sewage in conjunction with sedimentation in final clarifiers; to improve sedimentation processes as a conditioner preceding sedimentation, either with or without recirculation of settled matter; to provide uniform and even distribution of flow in operations involving changes from a high to a low velocity; as a conditioner of either flocculent matter or sludges or mixtures thereof preceding filtration operations; in conjunction with certain manufacturing treatment processes as an agglomerator, clarifier, conditioner, collector, separator and flow regulator combined, or as any one of these functions, or any combination of these functions.

I claim:

1. An improved apparatus for the treatment of aqueous liquors which comprises a liquor mixing basin having an inlet for the admission of liquor thereto and an outlet for the discharge of liquor therefrom, a chamber having an inlet in the lower end portion thereof for the admission of liquor thereto communicating with the discharge opening of the mixing basin, means for progressively decreasing the rate of flow of liquor as it flows upwardly in the chamber, means for discharging the liquor from the upper end portion of the chamber, a sedimentation basin adapted to receive liquor discharged from the chamber, conduit connecting means between the sedimentation basin and a reactivating vessel for passing liquor from the sedimentation basin into the vessel, and conduit means connecting the vessel and the mixing basin for the passage of liquor therebetween.

2. Apparatus for the treatment of aqueous liquor comprising a mixing basin, a chamber rectangular in horizontal section having an opening along one side adjacent its bottom, a conduit connecting the mixing basin with the opening of the chamber, a gate for regulating the size of the opening to control the flow of liquor therethrough, said chamber being provided with baffles for controlling the flow of liquor upwardly therein, and a weir along the top of the side opposite the side having the opening therein for discharging liquor from the chamber.

3. Apparatus for the treatment of aqueous liquor comprising a mixing basin, a chamber rectangular in horizontal section having an opening along one side adjacent its bottom, a conduit connecting the mixing basin with the opening of the chamber, a gate for regulating the size of the opening to control the flow of liquor therethrough, said chamber being provided with baffles for controlling the flow of liquor upwardly therein, a weir along the top of the side opposite the side having an opening therein for discharging liquor from the chamber, and a sedimentation basin connected along one side of the chamber whereby liquor may overflow the weir into the sedimentation basin.

4. Apparatus for the treatment of aqueous liquor comprising a mixing basin, a chamber rectangular in horizontal section having an opening along one side adjacent its bottom, a conduit connecting the mixing basin with the opening of the chamber, a gate for regulating the size of the opening to control the flow of liquor therethrough, a weir along the top of the side opposite the side having an opening therein for discharging liquor from the chamber, and a plurality of baffles within the chamber alternately attached to the sides and extending the width thereof.

5. The improvement in the treatment of aqueous liquor containing objectionable matter which comprises subjecting the liquor to an agglomeration treatment, withdrawing liquor containing a relatively high concentration of flocculent matter from the agglomeration treatment, subjecting the withdrawn liquor to a reactivation treatment, incorporating the liquor subjected to reactivation treatment in the liquor prior to the agglomeration treatment, passing the remaining liquor into a basin filled with liquor to a desired level in the form of a relatively wide stream along one side thereof adjacent the level of liquor, and discharging liquor from the basin adjacent the level of liquor and along a side opposite the first-mentioned side.

6. The improvement in the treatment of aqueous liquor containing objectionable matter which comprises adding a floc-producing agent a principal constituent of which is an iron salt to the liquor, passing the liquor into the lower portion of a chamber and upwardly therein at a progressively decreasing rate of flow as the liquor rises in the chamber to effect an agglomeration and clarification of the liquor, withdrawing liquor containing a relatively high concentration of flocculent matter from the chamber, adjusting the pH of the withdrawn liquor to a concentration of hydrogen ions represented by a range in pH from 8 to 10 by the addition of a reactivating agent, thereby reactivating the flocculent matter, and incorporating the reactivated flocculent matter in a fresh body of liquor prior to passing the same into the chamber.

7. The improvement in the treatment of aqueous liquor containing objectionable matter which comprises adding a floc-producing agent to the liquor, passing the liquor into the lower portion of a chamber and upwardly therein at a progressively decreasing rate of flow as the liquor rises in the chamber to effect an agglomeration and clarification of the liquor, withdrawing liquor containing a relatively high concentration of flocculent matter from the chamber, adjusting the pH of the withdrawn liquor to a concentration of hydrogen ions represented by a range in pH from 3 to 4 by the addition of a reactivating agent, thereby reactivating the flocculent matter, and incorporating reactivated flocculent matter in a fresh body of liquor prior to passing the same into the chamber.

8. An improved apparatus for the treatment of aqueous liquor containing objectionable matter which comprises a chamber having an inlet in the lower portion thereof for the admission of liquor thereto, means for controlling the flow of liquor through said inlet, baffles stationary during operation in the lower portion of the chamber which are constructed and arranged to provide a restricted passageway for controlling the velocity of flow of the liquor sufficiently to propel foreign matter contained in the liquor upwardly into the central portion of the chamber, means connecting the inlet with the restricted passageway, additional baffles in the central portion of the chamber spaced in a manner progressively to decrease the velocity as the liquor rises in the chamber, means for discharging the liquor together with the major portion of the entrained solid matter from the upper portion of the chamber, and a sedimentation unit adapted to receive the liquor discharged from the chamber.

9. Apparatus for the treatment of aqueous liquor which comprises a mixing basin, a chamber having at least two upright side-walls the inner surfaces of which lie in substantially continuous planes, an elongated opening communicating with the bottom of the chamber, a conduit connecting the mixing basin with the said opening, said chamber being provided with baffles extending into the chamber from the opposite side-walls which are mounted to be stationary during operation for controlling the flow of liquor upwardly therein, one or more of said baffles being arranged to provide a Venturi throat through which the liquor flows in the chamber, and a sedimentation basin one side-wall of which is common with one of said chamber side-walls and has an elongated horizontal edge over which incoming liquor from said chamber flows in a sheet-like stream into the basin.

10. In the treatment of aqueous liquor containing objectionable matter, the method which comprises passing the liquor containing a floc-producing agent into the lower end portion of a suitable chamber at a relatively high rate of flow, the said rate of flow being such as to prevent an accumulation of flocculent matter in the lower portion of the chamber, then passing the liquor upwardly in the chamber at a progressively decreasing rate of flow such as to effect an agglomeration of flocculent matter and the formation of a suspended blanket of such flocculent matter in the liquor above the lower end portion of the chamber, and removing clarified liquor together with suspended agglomerated flocculent matter from the upper portion of the chamber.

11. The improvement in the treatment of incoming aqueous liquor containing objectionable matter, which comprises withdrawing liquor containing a relatively high concentration of flocculent matter formed through the action of a chemical coagulant on the liquor from one step in the treatment, adjusting the pH of the withdrawn liquor to an ionic concentration in the vicinity of the solubility point of the flocculent matter, the ionic concentration after adjustment being such that the flocculent matter has charges imparted thereto and maintained as a gel without converting it into a colloidal sol, and incorporating the so treated withdrawn liquor containing charged flocculent matter into the incoming aqueous liquor undergoing treatment.

12. The improvement in the treatment of incoming aqueous liquor containing objectionable matter, which comprises withdrawing liquor containing a relatively high concentration of flocculent matter formed through the action of a chemical coagulant on the liquor from one step in the treatment, adjusting the pH of the withdrawn liquor to a concentration of hydroxyl ions which is in the vicinity of pH 10, while maintaining the flocculent matter as a gel, by the addition thereto of a reactivating agent, the hydroxyl ions at such concentration reactivate the flocculent matter by imparting negative charges thereto but do not convert the flocculent matter into a colloidal sol, and incorporating the so treated withdrawn liquor containing reactivated flocculent matter into incoming aqueous liquor undergoing treatment.

13. The improvement in the treatment of aqueous liquor containing objectionable matter which comprises adding a floc-producing agent to the liquor, passing the liquor into the lower portion of a chamber and upwardly therein at a progressively decreasing velocity as the liquor rises in the chamber, suspending flocculent matter in the liquor rising in the chamber thereby producing a concentration of such matter, passing the liquor into a sedimentation basin, flowing the liquor through the basin and permitting sedimentation of agglomerated flocculent matter to take place, withdrawing a relatively small portion of liquor from the sedimentation basin containing a relatively high concentration of agglomerated flocculent matter, reactivating such flocculent matter by the addition of ionic charges thereto, and returning the reactivated flocculent matter to the process.

14. The improvement in the treatment of aqueous liquor which comprises passing liquor containing a floc-producing agent upwardly in a chamber at a progressively decreasing velocity, suspending flocculent matter in the form of a blanket in the liquor rising in the chamber thereby producing a concentration of such matter, withdrawing liquor containing a portion of the concentrated flocculent matter from the vicinity of the suspended blanket, imparting ionic charges to the flocculent matter of the withdrawn liquor, and incorporating the flocculent matter having ionic charges imparted thereto in a fresh body of liquor undergoing treatment.

15. The improvement in the treatment of aqueous liquor containing objectionable matter which comprises effecting a flocculation of the objectionable matter in a body of the liquor, withdrawing liquor containing flocculent matter from the body of liquor, subjecting the withdrawn liquor to the action of a hydrogen ion-bearing agent of such character and such amount to convert the pH of the liquor to about 3 and impart to the flocculent matter positive charges thereby reactivating the flocculent matter, said reactivated matter being maintained in the form of a gel, and returning the liquor containing reactivated flocculent matter to a fresh body of liquor to be treated.

16. The improvement in the treatment of aqueous liquor containing objectionable matter which comprises effecting a flocculation of the objectionable matter in a body of the liquor, withdrawing a relatively small portion of liquor containing flocculent matter from the body of liquor, subjecting the withdrawn liquor to the action of a hydroxyl ion-bearing agent of such character and in such amount to convert the pH of the liquor to from 8 to 10 and impart to the flocculent matter negative charges but maintain the flocculent matter in the form of a gel, and returning the flocculent matter having negative charges imparted thereto to the liquor being treated.

CLARENCE J. VELZ.